(12) United States Patent
Henning et al.

(10) Patent No.: US 8,779,079 B2
(45) Date of Patent: Jul. 15, 2014

(54) SILICONE POLYETHER COPOLYMERS AND PROCESS FOR PREPARATION THEREOF

(75) Inventors: Frauke Henning, Essen (DE); Frank Schubert, Neukirchen-Vluyn (DE); Wilfried Knott, Essen (DE); Horst Dudzik, Essen (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 12/837,677

(22) Filed: Jul. 16, 2010

(65) Prior Publication Data

US 2011/0021693 A1    Jan. 27, 2011

(30) Foreign Application Priority Data

Jul. 24, 2009   (DE) .................. 10 2009 034 607

(51) Int. Cl.
  *C08G 77/46*    (2006.01)
(52) U.S. Cl.
  USPC .............................. 528/27; 528/403; 528/419
(58) Field of Classification Search
  None
  See application file for complete search history.

(56) References Cited

U.S. PATENT DOCUMENTS

| | | | |
|---|---|---|---|
| 5,430,166 A | 7/1995 | Klein et al. | |
| 5,475,127 A | 12/1995 | Klein et al. | |
| 5,880,245 A * | 3/1999 | Fujita et al. | 528/27 |
| 5,934,579 A | 8/1999 | Hiersche et al. | |
| 6,291,622 B1 | 9/2001 | Droese et al. | |
| 6,307,082 B1 | 10/2001 | Klein et al. | |
| 6,858,663 B2 | 2/2005 | Knott et al. | |
| 7,125,585 B2 | 10/2006 | Dudzik et al. | |
| 7,157,541 B2 | 1/2007 | Knott et al. | |
| 7,196,153 B2 | 3/2007 | Burkhart et al. | |
| 7,598,334 B2 | 10/2009 | Ferenz et al. | |
| 7,612,158 B2 | 11/2009 | Burkhart et al. | |
| 7,612,159 B2 | 11/2009 | Burkhart et al. | |
| 7,619,035 B2 | 11/2009 | Henning et al. | |
| 7,674,385 B2 * | 3/2010 | Heitner | 210/698 |
| 7,691,912 B2 * | 4/2010 | Ou et al. | 521/64 |
| 2007/0043193 A1 | 2/2007 | Henning et al. | |
| 2007/0049717 A1 | 3/2007 | Knott et al. | |
| 2007/0128143 A1 | 6/2007 | Gruening et al. | |
| 2008/0125503 A1 | 5/2008 | Henning et al. | |
| 2008/0153934 A1 | 6/2008 | Neumann et al. | |
| 2008/0153992 A1 | 6/2008 | Knott et al. | |
| 2008/0153995 A1 | 6/2008 | Knott et al. | |
| 2009/0030097 A1 | 1/2009 | Knott et al. | |
| 2009/0137751 A1 | 5/2009 | Knott et al. | |
| 2009/0137752 A1 | 5/2009 | Knott et al. | |
| 2010/0022435 A1 | 1/2010 | Henning et al. | |
| 2010/0029587 A1 | 2/2010 | Brueckner et al. | |
| 2010/0041910 A1 | 2/2010 | Schubert et al. | |
| 2010/0056649 A1 | 3/2010 | Henning et al. | |
| 2010/0071849 A1 | 3/2010 | Knott et al. | |
| 2010/0081781 A1 | 4/2010 | Schubert et al. | |

FOREIGN PATENT DOCUMENTS

| | | |
|---|---|---|
| EP | 0506086 | 9/1992 |
| EP | 2093244 | 8/2009 |
| WO | WO 89/03851 | 5/1989 |
| WO | WO 2005/078036 | 8/2005 |
| WO | WO 2010/063531 | 6/2010 |

OTHER PUBLICATIONS

"Competitive Polymerization between Organic and Inorganic Networks in Hybrid Materials" authored by Innocenzi et al and published in Chemistry of Materials (2000) 12, 3726-3732.*

* cited by examiner

*Primary Examiner* — Marc Zimmer
(74) *Attorney, Agent, or Firm* — Frommer Lawrence & Haug LLP

(57) ABSTRACT

Novel silicone polyether copolymers of inverse structure of the formula 1, characterized in that no unsaturated functional groups caused by side reactions or conversion products thereof are present in the copolymer, and a process for preparation thereof, in which a polyether modified terminally and/or laterally with alkoxysilyl groups is reacted with silanes and/or siloxanes which bear one or more hydrolysis-labile groups, in a hydrolysis and condensation reaction.

8 Claims, 2 Drawing Sheets

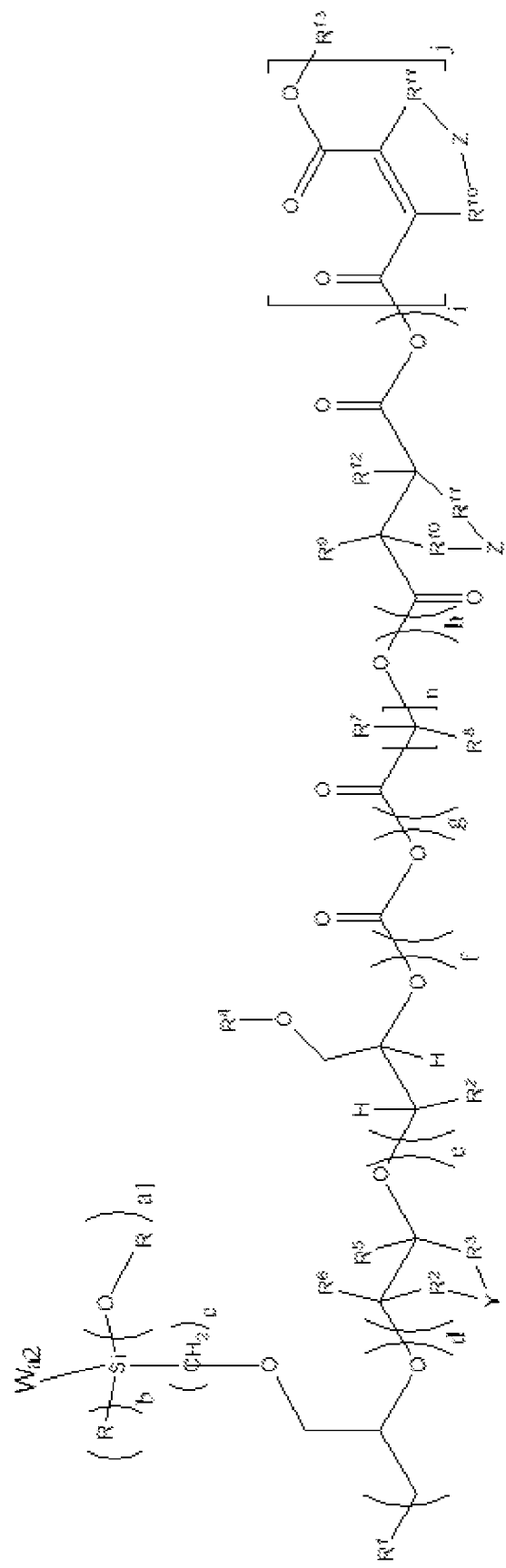
Figure 1 - Formula (1)

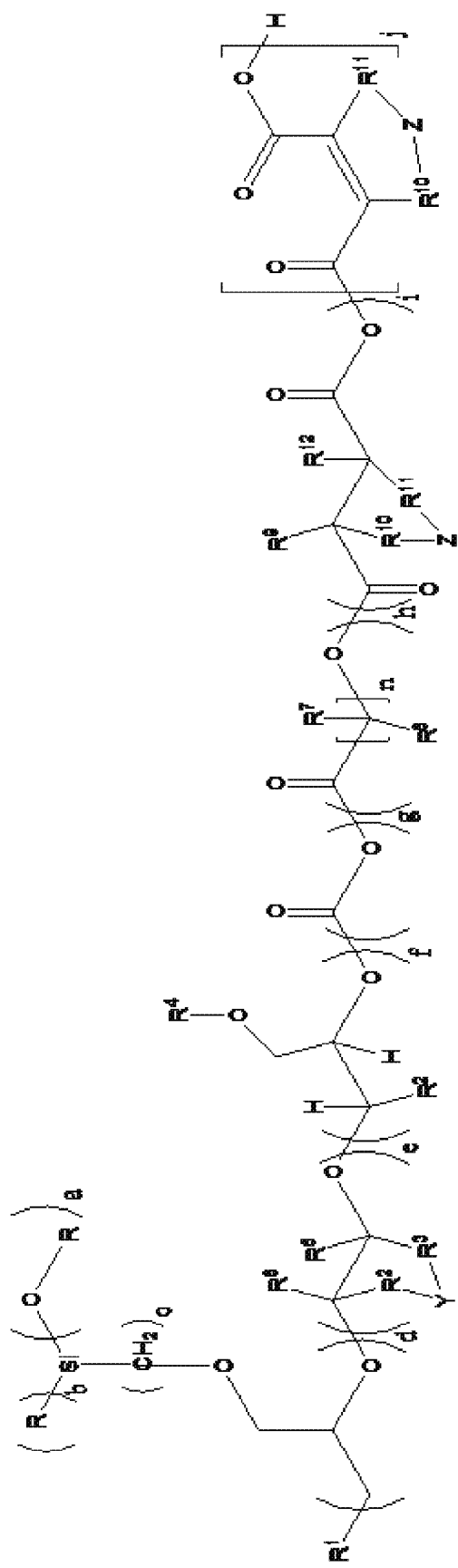
Figure 2 – Formula (3)

SILICONE POLYETHER COPOLYMERS AND PROCESS FOR PREPARATION THEREOF

This application claims benefit under 35 U.S.C. 119(a) of German patent application DE 10 2009 034607.4, filed on 24 Jul. 2009.

Any foregoing applications including German patent application DE 10 2009 034607.4, and all documents cited therein or during their prosecution ("application cited documents") and all documents cited or referenced in the application cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention.

The invention relates to novel silicone polyether copolymers and to a process for preparation thereof, in which a polyether modified terminally and/or laterally with alkoxysilyl groups is reacted with silanes and/or siloxanes which bear at least one hydrolysis-labile group, alone or in a mixture with siloxanes which do not bear a hydrolysis-labile group, in one process step by hydrolysis and condensation reaction.

The inventive compounds constitute a novel class of silicone polyether copolymers, in which the attachment of the siloxane body to the polyether takes place via hydrolysis-stable SiC bonds. The novel compounds are referred to hereinafter as silicone polyether copolymers, even if the structure in some cases does not include the features of a polymeric ether and/or of a silicone in the customary sense. However, the structural correlation of polyether structural elements and silicones with those of the novel compounds is distinctly and clearly evident to the person skilled in the art.

In the context of this invention, the term "polyether" encompasses polyethers, polyetherols, polyether alcohols, polyether esters, but also polyether carbonates, which are in some cases used synonymously to one another. It is not required that the expression "poly" must go hand in hand with a multitude of ether functionalities or alcohol functionalities in the molecule or polymer. Instead, this merely indicates that at least repeat units of individual monomer units or else compositions are present, which have a relatively high molar mass and additionally also have a certain polydispersity.

The word fragment "POLY" in the context of this invention does not encompass exclusively compounds with at least 3 repeat units of one or more monomers in the molecule, but especially also compositions of compounds which have a molecular weight distribution and possess a mean molecular weight of at least 200 g/mol. This definition takes account of the fact that, in the field of industry in question, it is customary to define such compounds already as polymers even if they do not appear to satisfy a polymer definition analogous to the OECD or REACH Guidelines.

STATE OF THE ART

Polyethersiloxanes have various uses, since the properties thereof, especially the hydrophilic/hydrophobic balance thereof, can be adjusted by suitable selection of the siloxane block or of the siloxane blocks on the one hand, and by suitable formation of the polyether block or of the polyether blocks, and can be adjusted to the desired value.

In the case of the silicone polyether copolymers, a fundamental distinction is drawn between SiOC- and SiC-bonded systems. While the hydrolysis-labile SiOC-bonded systems are preparable by reaction of hydroxy-functional polyethers with chlorosiloxanes or alkoxysiloxanes, the SiC-bonded systems are obtained by the noble metal-catalysed hydrosilylation of usually monounsaturated polyethers with hydrosiloxanes. The noble metal-catalysed hydrosilylation of allyl polyethers competes with the allyl-propenyl rearrangement. This side reaction is undesired not only because it requires the use of excess polyether which is associated with a product dilution, but also the hydrolytic degradation of the propenyl polyethers leads to formation of propionaldehyde which, among other effects, imparts an unpleasant odour to the product.

EP 0368195 A1 describes what are known as inverse silicone polyether copolymers which, in contrast to the familiar structures with a central silicone framework, have a polyunsaturated polyether as the central framework which, in the second step, is modified by hydrosilylation with monofunctional hydrosiloxanes. The polyunsaturated polyether is prepared by means of alkoxylation of alkylene oxides in a mixture with olefinically unsaturated epoxides, for example allyl glycidyl ether. The olefinic epoxide can be inserted into the polyether chain in random or block distribution, which, in the case of alkaline catalysis, can be built up typically to a chain length and hence molar mass of about 4000 g/mol. Although EP-A1-0 368 195 (U.S. Pat. No. 4,962,218) claims a molecular weight range of 650 g/mol to 20 000 g/mol, only polyethers with molar masses of 1020 g/mol to 1640 g/mol are disclosed. According to the reaction temperatures and catalyst concentrations, the allylic double bonds can isomerize to propenyl ethers as early as during the alkaline alkoxylation. The allylic double bond contents of the polyunsaturated polyether thus prepared can be converted thereafter by noble metal-catalysed hydrosilylation with SiH-functional silanes or siloxanes purified by distillation. One advantage of the teaching of EP-A1-0 368 195 (U.S. Pat. No. 4,962,218) is that the products are not diluted by excess propenyl polyethers. The increased product purity of these inverse polyethersiloxanes is disclosed in EP-A1-0 368 195 (U.S. Pat. No. 4,962,218) with reference to gel permeation chromatograms.

Nevertheless, EP-A1-0 368 195 (U.S. Pat. No. 4,962,218) concedes that, in the hydrosilylation of the polyunsaturated polyethers, only less than 90 mol % of the allyl groups are converted, and that the remaining unsaturated groups are present in the form of hydrolysis-labile propenyl functions. The problem of odour affliction as a result of the hydrolytic release of propionaldehyde has thus not been solved. Since EP-A1-0 368 195 (U.S. Pat. No. 4,962,218) does not disclose viscosities, it is not evident whether there is a molar mass increase and hence viscosity increase as a result of further side reactions, some of which may be coupled to the allyl-propenyl rearrangement, during the hydrosilylation. As known to those skilled in the art, the storage of a propenyl-containing polyethersiloxane at room temperature already leads to increasing molar mass and odour development. In order to improve the storage stability and prevent the odour affliction, the prior art discloses various deodorizing processes, which, as an additional process step, inflate costs. EP-A1-0 506 086 (U.S. Pat. No. 5,110,970) describes the preparation of inverse silicone polyether copolymers in a two-stage process. In the first step, a polyunsaturated polyether is hydrosilylated with triethoxysilane. The resulting alkoxysilyl-functional polyether is then reacted under hydrolytic conditions with trimethylchlorosilane with outgassing of hydrogen chloride. According to the teaching of EP-A1-0 506 086 (U.S. Pat. No. 5,110,970) too, only 85 mol % of the allyl groups are hydrosilylated. Compared to a one-stage hydrosilylation of $((CH_3)_3SiO)_3SiH$, referred to as M3T for short, of polyunsaturated polyethers, the two-stage process via the intermediate of the alkoxysilyl-functional polyether gives higher overall yields, but yield losses resulting from the allyl-propenyl rearrangement comparable to the teaching of EP-A1-0 368 195 (U.S. Pat. No. 4,962,218) are recorded in the hydrosilylation stage. Although the odour affliction of the end product may be reduced as a result of the hydrolytic conditions of the second stage and the distillative workup, this is not a high-selectivity reaction which leads to high-purity products since the degree of modification of the silicone polyether copolymer can be adjusted only indirectly by the formulation and is additionally highly dependent on process variations in the hydrosilylation and the associated extent of the side reactions. As Example II disclosed in EP-A1-0 506 086 shows, a viscous product is already obtained in the hydrosilylation stage, which remains viscous after the reaction with trimethylchlorosilane disclosed in Example III. Since no viscosities are disclosed, it is not evident whether a viscosity increase or decrease in the already viscous product occurs in the second stage. As familiar to the person skilled in the art, viscosity increases in reactions are an indication of molar mass increase, whether caused, for example, by an intended chain extension or else resulting from an unintended crosslinking of polymer chains in a side reaction.

Further disadvantages in terms of process technology of the process disclosed in EP-A1-0 506 086 (U.S. Pat. No. 5,110,970) result from the outgassing of hydrogen chloride from an alcoholic solution. The highly corrosive offgas has to be collected in scrubbers. When organochlorine compounds are also present as by-products in the offgas, the waste air has to be cleaned further.

Alkoxysilyl-functional polymers of very different chemical structure find use, among other uses, as reactive adhesives and sealants curable in the presence of moisture, as binders, as coating materials and surface modifiers for a wide variety of different inorganic and organic substrates, including, for example, particles, fibres, wovens and fabrics of all kinds, and also as raw materials for isocyanate-free aerosol foams (foamable sealants and adhesives).

A particularly widespread type of alkoxysilane-functional polymers is that of alkoxysilane-terminated prepolymers. These may be formed from different units. These prepolymers typically possess an organic backbone, i.e. they are formed, for example, by polyurethanes, polyethers, polyesters, polyacrylates, polyvinyl esters, ethylene-olefin copolymers, styrene-butadiene copolymers or polyolefins, described, for example, in WO 2005/100482, EP-A1-1967550 (US 2009-0088523), U.S. Pat. Nos. 7,365,145, 3,627,722, 3,632,557 and in U.S. Pat. No. 3,971,751. However, other widespread systems are those whose backbone consists entirely or at least partly of organosiloxanes, described, inter alia, in WO 96/34030 (U.S. Pat. No. 6,441,118).

The reaction of alkoxysilyl-functional polyethers with silanes or siloxanes leads in the prior art, in the manner of curing of the reactive material, to coatings. Examples thereof are JP 2005113063 or JP 11012473.

In order to accomplish good intermolecular crosslinking in the course of curing, usually trialkoxy-functional silanes, for example methyltriethoxysilane, in some cases also in a mixture with dimethyldiethoxysilane, and/or tetraalkoxy-functional silanes such as tetraethoxysilane, or else hydrolysates thereof, are used. Since the molar bond energy of a silicon-oxygen bond at 444 kJ/mol (source: Hollemann-Wiberg, Lehrbuch der Anorganischen Chemie [Textbook of Inorganic Chemistry], 101st Edition, p. 141) is significantly above the bond energy of a carbon-oxygen bond of 358 kJ/mol, the formation of a macromolecular network is thermodynamically preferred.

The majority of the synthesis routes described to alkoxysilane-terminated prepolymers disclose merely silane functionalization at the chain ends of the prepolymers. The as yet unpublished patent application DE 10 2008 000360.3 (Ser. No. 12/389,667) describes a process for preparing alkoxysilyl-functional polyethers, which allows silane functionalization both in the polymer chain and at the chain end.

It was thus an object of the present invention to provide, by a fundamentally different synthesis process, access to novel polyethers which are free of propenyl ether groups and have been modified with alkoxysilyl groups, alkoxysiloxanyl groups and/or siloxanyl groups, individually or in a mixture with one another.

It is a further object of the present invention to provide a process for preparing these novel silicone polyether copolymers in the form of storage-stable compounds which are free of troublesome by-products.

Storage stability in the context of the present invention means that the viscosity of the end product, in the course of storage at room temperature with exclusion of water after one year, still does not have a significant increase in viscosity of more than 20% of the starting value. This is important especially for high molecular weight products with molar masses more than 10 000 g/mol, preferably more than 20 000 g/mol, since the starting viscosity of these products is already sufficiently high that only a minimal amount of crosslinked chains, which is undetectable by spectroscopy, is required for gelation.

The viscosity increase is caused, for example, by gelation, triggered by intermolecular hydrolysis and condensation reactions of the alkoxysilyl groups, or by crosslinking side reactions in the presence of propenyl ether groups.

The objects are achieved by the preparation of novel silicone polyether copolymers of the formula (1) with an inverse chemical structure which has not been preparable to date.

The present invention provides compounds which are free of propenyl ether groups and are silicone polyether copolymers of the formula (1)

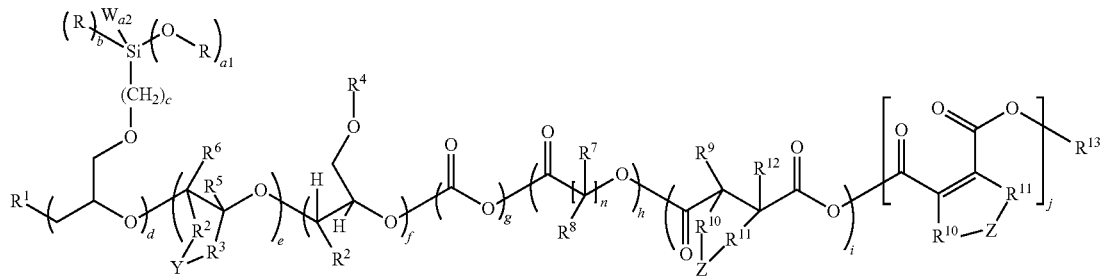

formula (1) - see also Figure 1 where
a1 is an integer of 0, 1 or 2,
a2 is an integer of 1, 2 or 3,
b is an integer of 0, 1 or 2, preferably 0 or 1, more preferably 0 and the sum of a1, a2 and b is equal to 3,
c is an integer of 0 to 22, preferably of 0 to 12, more preferably of 0 to 8, even more preferably of 0 to 4 and especially 1 or 3,
d is an integer of 1 to 500, preferably 1 to 100, more preferably 2 to 20 and most preferably 2 to 10,
e is an integer of 0 to 10 000, preferably 1 to 2000, more preferably 2 to 2000 and especially 2 to 500,
f is an integer of 0 to 1000, preferably 0 to 100, more preferably 0 to 50 and especially 0 to 30,
g is an integer of 0 to 1000, preferably 0 to 200, more preferably 0 to 100 and especially 0 to 70,
h, i and j are each independently integers of 0 to 500, preferably 0 to 300, more preferably 0 to 200 and especially 0 to 100,
n is an integer from 2 to 8,
and
R are independently one or more identical or different radicals selected from linear or branched, saturated, mono- or polyunsaturated alkyl radicals having 1 to 20, especially 1 to 6, carbon atoms or haloalkyl groups having 1 to 20 carbon atoms; R is preferably methyl, ethyl, propyl, isopropyl, n-butyl and sec-butyl groups; and
$R^1$ is a hydroxyl group or a saturated or unsaturated, linear, branched or cyclic or further-substituted oxyorganic radical having 1 to 1500 carbon atoms, where the chain may also be interrupted by heteroatoms such as O, S, Si or N, or a radical comprising an oxyaromatic system, or $R^1$ is an unsaturated ether-functional group in which there is no C—C double bond in a β position to an oxygen or C—C double bonds are more preferably present only terminally, preferably an alkoxy, arylalkoxy or alkylarylalkoxy group and especially a polyether radical in which the carbon chain may be interrupted by oxygen atoms, or a singularly or multiply fused oxyaromatic group or an optionally branched silicone-containing organic radical,
$R^2$ or $R^3$, and $R^5$ or $R^6$, are the same or else independently H and/or a saturated and/or optionally mono- and/or polyunsaturated, also further-substituted, optionally mono- or polyvalent hydrocarbon radical, where the $R^5$ or $R^6$ radicals are a monovalent hydrocarbon radical and the hydrocarbon radical may be bridged cycloaliphatically via the Y fragment; Y may be absent, or else may be a methylene bridge having 1 or 2 methylene units; when Y is absent, $R^2$ or $R^3$ are each independently a linear or branched radical having 1 to 20, preferably 1 to 10, carbon atoms, more preferably a methyl, ethyl, propyl or butyl, vinyl, allyl radical or phenyl radical; preferably at least one of the two $R^2$ and $R^3$ radicals is hydrogen, and $R^2$—$R^3$ may be a —CH$_2$CH$_2$CH$_2$CH$_2$— group, Y thus being a —(CH$_2$CH$_2$—)— group. The hydrocarbon radicals $R^2$ and $R^3$ may in turn have further substitution and bear functional groups such as halogens, hydroxyl groups or glycidyloxypropyl groups,
$R^4$ is a linear or branched alkyl radical of 1 to 24 carbon atoms or an aromatic or cycloaliphatic radical which may optionally in turn bear alkyl groups;
$R^7$ and $R^8$ are each independently hydrogen, alkyl, alkoxy, aryl or aralkyl groups,
$R^9$, $R^{10}$, $R^{11}$ and $R^{12}$ are each independently hydrogen, alkyl, alkenyl, alkoxy, aryl or aralkyl groups, where the hydrocarbon radical may be bridged cycloaliphatically or aromatically via the Z fragment and Z may either be a divalent alkylene or alkenylene radical,
$R^{13}$ is either hydrogen or W, more preferably hydrogen,
W is a linear or branched or cyclic organomodified silyl or siloxanyl radical of the formula (2)

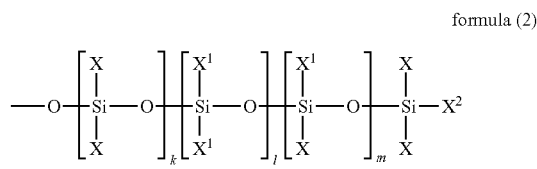

formula (2)

where
k is an integer of 0 to 200, preferably 0 to 50 and especially 0 to 5,
l is an integer of 0 to 200, preferably 0 to 50 and especially 0 to 5,
m is an integer of 0 to 200, preferably 0 to 50 and especially 0 to 5,
X is a linear, cyclic or branched, aliphatic or aromatic, saturated or unsaturated hydrocarbon radical having 1 to 20 carbon atoms, which may optionally contain heteroatoms such as oxygen, nitrogen, phosphorus or sulphur, but which is preferably a methyl group,
$X^1$ is hydrogen or a linear, cyclic or branched, aliphatic or aromatic, saturated or unsaturated hydrocarbon radical having 1 to 20 carbon atoms, and may contain heteroatoms such as oxygen, nitrogen, phosphorus or sulphur, but is different from X,
$X^2$ is X, $X^1$ or an alkoxy group,
with the proviso that the sum of the fragments d to j is greater than or equal to 3 when $R^1$ consists only of one monomer or oligomer, and with the proviso that the fragments with the indices d, e, f and/or h are freely permutable with one another, as are the fragments with the indices k, l and/or m, i.e. are exchangeable for one another within the polyether chain or the siloxane chain and may be present as desired in random distribution or in block sequence and hence are exchangeable for one another in the sequence within the polymer chain.

The different monomer units both of the fragments with the indices d to f and h, and k to m, and of the polyoxyalkylene chain of the substituent $R^1$ which may be present may be built up in a blockwise manner with one another or else be subject to a random distribution.

These novel compounds, referred to hereinafter as silicone polyether copolymers, can be obtained from highly alkoxysilyl-functional organic polymers with a functionality density of up to 4 trialkoxysilyl equivalents per 1000 g/mol, without gelation, by full or partial hydrolysis, as desired, and condensation reaction of the polymer-bound alkoxysilyl groups with reactive silanes, preferably monomeric hydrolytically cleavable alkoxy- or acyloxysilanes, optionally further reactive silicon compounds and water, and if required in the presence of a catalyst. The novel, likewise inventive compounds constitute a novel class of silicone polyether copolymers, in which the attachment of the siloxane body to the polyether takes place via hydrolysis-stable SiC bonds.

It is a particular distinguishing feature and a technical advantage of this novel class of silicone polyether copolymers over technical polyethersiloxanes obtained in a conventional manner via the route of noble metal-catalysed hydrosilylation that they contain no excess polyethers which usually make up 20-40% by weight of the overall product in conventionally prepared products and impart to the system an increased hydrophilicity which is often undesired in surfactant applications. The inventive silicone polyethers thus constitute novel copolymers with regard to the absence of free organic polyether components. The chemical composition thereof and hence the hydrophilic-hydrophobic balance thereof are controllable within wide ranges via the flexible selection of the synthesis conditions. For instance, the length and arrangement of the hydrophobic siloxane body and that of the usually more hydrophilic polyether moiety can be established reproducibly within wide ranges.

A further advantage of this novel class of silicone polyether copolymers is that no side reactions lead to formation of propenyl ethers which are decomposed hydrolytically in the course of storage of the product under the action of air humidity. Therefore, no propionaldehyde is released, which could lead to an undesired odour affliction of the product.

Unlike silicone polyethers prepared conventionally via hydrosilylation, the process according to the invention additionally gives access to silicone polyethers which bear reactive alkoxysilyl groups and whose polyether moiety is functionalized with hydrolytically crosslinkable alkoxysilyl and/or alkoxysiloxanyl groups. In the case of suitable selection of the reaction conditions in the preparation process according to the invention, for example a substoichiometric measurement of monoalkoxysilane and water relative to the trialkoxysilyl groups of less than three equivalents of monoalkoxysilane and less than 1.5 moles of water per trialkoxysilyl equivalent, reactive, hydrolysable silicone polyethers are thus obtained, the silicone content of which is adjustable via the degree of conversion of the alkoxysilyl groups to siloxanyl groups.

It has now been found that, surprisingly, the acid-catalysed and/or metal complex-catalysed hydrolytic reaction of alkoxysilyl-functional polyethers with reactive silanes such as alkoxysilanes and/or siloxanes leads to propenyl ether-free inverse silicone polyether copolymers. The propenyl contents are determined by $^1$H NMR spectroscopy and are, in the case of the present invention, at contents of less than 1% by weight, preferably less than 0.1% by weight, of the C—C double bond proportions.

During the reaction, no new C—C double bonds are formed and the proportion of C—C double bonds in the polymer remains unchanged.

The acid-catalysed and/or metal complex-catalysed, hydrolytic reaction described in accordance with the invention is surprising to the person skilled in the art and was in no way foreseeable, since the prior art discloses only substantial gelation as a result of intermolecular crosslinking of alkoxysilyl-functional polyethers, reactive silanes such as alkoxysilanes or -siloxanes, in the presence of water.

Since a silicon-oxygen bond is already present in the alkoxysilanes and the siloxanes, as compared with the chlorosilanes, it is to be expected that reactions with alkoxysilanes and alkoxysilyl-functional polyethers will proceed more slowly than the reactions with chlorosilanes, and are additionally accompanied by side reactions, for example gelation as a result of intermolecular crosslinking between the alkoxysilyl-functional polyethers. This makes the finding disclosed here, that gelation-free products are obtained by means of an acid-catalysed and/or metal complex-catalysed, hydrolytic reaction of alkoxysilyl-functional polyethers with alkoxysilanes and/or siloxanes, all the more surprising.

In the process according to the invention, silicone polyether copolymers of the formula (1) are obtained by hydrolysis and condensation reaction of polymer-bound alkoxysilyl groups of an organic polymer, especially of an alkoxysilyl-functional polyether.

The invention preferably further provides silicone polyether copolymers of the formula (1), with the proviso that $R^1$ is a hydroxyl radical or a saturated, optionally branched oxyorganic radical or is unsaturated, but does not contain a non-aromatic C—C double bond in a β position to an oxygen.

The invention therefore more preferably further provides silicone polyether copolymers of the formula (1), with the proviso that $R^1$ is a saturated alkoxy or polyether radical.

The polyethers whose alkoxysilyl groups can be modified in accordance with the invention with water and with at least one monomeric reactive silane and possibly further silicon compounds, under optionally equilibrating conditions, referred to hereinafter as silyl polyethers, are compounds of the formula (3). Such silyl polyethers can be obtained by double metal cyanide (DMC)-catalysed alkoxylation reaction of epoxy-functional silanes and possibly further epoxides on an OH-functional starter compound $R^1$—H (4).

The preparation and the useable epoxide structure types are described in detail in DE 10 2008 000360.3, which was yet to be published at the priority date of the present application. The content of the description and of the claims of DE 10 2008 000360.3 (U.S. Ser. No. 12/389,667) is fully incorporated into this disclosure. The compounds thus prepared contain the modifiable alkoxysilyl functions, as desired, terminally, or else in isolated form, in cumulated blocks or else scattered randomly in the polyoxyalkylene chain.

The silyl polyethers of the formula (3) are notable in that they can be prepared in a controlled and reproducible manner with regard to structure formation and molar mass. The sequence of the monomer units can be varied within wide limits. Epoxy monomers may, as desired, be incorporated into the polymer chain in blockwise sequence or randomly.

The fragments inserted into the polymer chain which forms by the reaction with ring opening of the reaction components are freely permutable in terms of their sequence, with the restriction that cyclic anhydrides (indices i and j) and carbon dioxide (index g) are present inserted randomly, i.e. not in homologous blocks, in the polyether structure.

When poly-epoxy-functional alkoxysilanes are used as monomers in the alkoxylation according to DE 10 2008 000360.3 (U.S. Ser No. 12/389,667), this forms silyl polyethers of the formula (3) which form highly functionalized networks in which polyether chains which are each started from $R^1$—H and which contain, in their sequence, the freely permutable fragments which were inserted into the polymer chain which forms by the reaction with ring opening of the reaction components, are joined to one another via —CH$_2$—O—(CH$_2$)$_c$—Si—(CH$_2$)$_c$—O—CH$_2$— bridges. Highly complex, highly functionalized structures are thus formed. Here too, it is possible to adjust the functionalities in a controlled manner to a desired field of use. The degree of crosslinking and the complexity of the resulting polymer structures rise with increasing epoxy functionality of the silyl monomers. Very particular preference is given to 3-glycidyloxyalkyltrialkoxysilanes as monomers.

The fragments which were inserted into the polymer chain which forms by the reaction with ring opening can, in the context of the above definitions, occur in blockwise or random distribution, not just in the chain of a polyether structural unit, but also in random distribution over the multitude of the polyether structural units which are formed and are joined to one another via —CH$_2$—O—(CH$_2$)$_c$—Si—(CH$_2$)$_c$—O—CH$_2$— bridges. The diversity of the structural variations of the process products thus does not permit an absolutely clear description in terms of formula.

Preference is given to using, as silyl polyethers, those of the formula (3) which are formed proceeding from a starter compound $R^1$—H

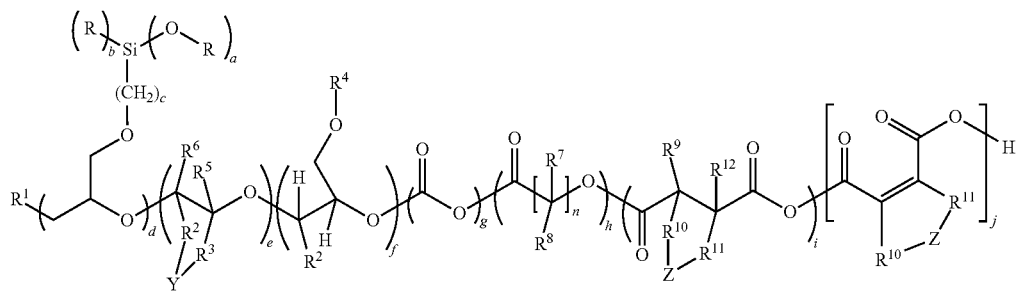

(3) - see also Figure 2 where
a is an integer from 1 to 3, preferably 3,
b is an integer from 0 to 2, preferably 0 to 1, more preferably 0, and the sum of a and b is equal to 3, the indices
c, d, e, f, g, h, i and j and the R, $R^1$ to $R^{12}$ and Y and Z radicals correspond to the definitions for formula (1).

The different monomer units of both the fragments with the indices d to f and h, and also the polyoxyalkylene chain of the substituent $R^1$ which may be present, may be in alternating blocks or else be subject to a random distribution.

Starter compounds are understood to mean substances which constitute the start of the polyether molecule (3) to be prepared, which is obtained by the addition of epoxy-functional monomers.

$R^1$ is a fragment which originates from the starter or the starter compounds for the alkoxylation reaction, of the formula (4)

$$R^1—H \quad (4)$$

(the H belongs to the OH group of an alcohol or of a phenolic compound), it being possible to use starters of the formula (4) alone or in mixtures with one another, which have at least one reactive hydroxyl group; the starter may thus also be water.

The OH-functional starter compounds $R^1$—H (4) used are preferably compounds with molar masses of 18 (water) to 10 000 g/mol, especially 50 to 2000 g/mol, and having 1 to 8, preferably having 1 to 4, hydroxyl groups.

The starters of the formula (4) used are preferably those in which $R^1$ is a hydroxyl group or a saturated or unsaturated, linear, branched or cyclic or further-substituted oxyorganic radical having 1 to 1500 carbon atoms, which may optionally also be interrupted by heteroatoms such as O, S, Si or N, or a radical containing an oxyaromatic system; or $R^1$ is an unsaturated ether-functional group in which there is no C—C double bond in a β position to an oxygen, or C—C double bonds are more preferably present only in terminal positions, preferably an alkoxy, arylalkoxy or alkylarylalkoxy group and especially a polyether radical, in which the carbon chain may be interrupted by oxygen atoms, or a singularly or multiply fused oxyaromatic group or an optionally branched silicone-containing organic radical.

In addition, $R^1$—H may be an oxyalkyl-functional siloxane or an hydroxy-functional polyethersiloxane.

The chain length of the polyether radicals which have alkoxy, arylalkoxy or alkylarylalkoxy groups and are useable as starter compounds is as desired. The polyether, alkoxy, arylalkoxy or alkylarylalkoxy group preferably contains 1 to 1500 carbon atoms, more preferably 2 to 300 carbon atoms, especially 2 to 100 carbon atoms.

The compounds of the formula (4) are preferably selected from the group of the alcohols, polyetherols or phenols. Preference is given to using, as the starter compound, a mono- or polyhydric polyether alcohol or alcohol $R^1$—H (the H belongs to the OH group of the alcohol or phenol), or else water.

It is advantageous to use low molecular weight polyetherols having 1 to 8 hydroxyl groups and molar masses of 50 to 2000 g/mol, which have in turn been prepared beforehand by DMC-catalysed alkoxylation, as starter compounds (4).

Examples of compounds of the formula (4) include water, allyl alcohol, butanol, octanol, dodecanol, stearyl alcohol, 2-ethylhexanol, cyclohexanol, benzyl alcohol, ethylene glycol, propylene glycol, di-, tri- and polyethylene glycol, 1,2-propylene glycol, di- and polypropylene glycol, 1,4-butanediol, 1,6-hexanediol, trimethylolpropane, glycerol, pentaerythritol, sorbitol, cellulose sugar, lignin or else further compounds which bear hydroxyl groups and are based on natural substances. In addition to compounds with aliphatic and cycloaliphatic OH groups, suitable compounds are any having 1 to 20 phenolic OH functions. These include, for example, phenol, alkyl- and arylphenols, bisphenol A and novolacs.

Silyl polyethers of the formula (3) consist of alkoxysilyl-substituted chains which are highly functionalized in a controlled manner through the selection of the fragments d to j, according to the fragments inserted into the polymer chain by the reaction with ring opening of the reaction components, and hence can be tailored to different fields of use.

The indices shown in the formulae cited here and the value ranges for the indices specified are therefore understood as the mean values of the possible statistical distribution of the structures actually present and/or mixtures thereof. This is also true of structural formulae shown in exact terms as such, for example of formula (1), (2) or (3).

According to the epoxy-functional alkoxysilane used and any further monomers used, and possibly also carbon dioxide, it is possible to obtain ester- or carbonate-modified silyl polyethers. The alkoxysilane unit in the compound of the formula (3) is preferably a trialkoxysilane unit.

As $^{29}Si$ NMR and GPC studies show, the process-related presence of chain-terminal OH groups gives rise to the possibility of transesterification reactions on the silicon atom both during the DMC-catalysed preparation and, for example, in a subsequent process step. In formal terms, it is possible to exchange the alkyl radical R bonded to the silicon via an oxygen atom for a long-chain modified alkoxysilyl polymer radical. Bimodal and also multimodal GPC curves demonstrate that the alkoxylation products, in addition to the non-transesterified species as shown in formula (3), are those with double, in some cases triple or even many times the molar mass. Formula (3) therefore shows the complex chemical reality only in simplified form.

"Monomodal" in the context of the present invention means the presence of only one maximum in the gel permeation chromatogram, whereas, in a multimodal distribution, at least one local maximum is present aside from the main peak. A multimodal distribution may be caused by transesterification reactions during the preparation process of the silyl polyethers or else by other process settings, for example a particular selected dosage sequence of starter and epoxy monomers. The presence of transesterification products in the silyl polyether thus does not inevitably cause a multimodal molar mass distribution. The degree of transesterification on the silyl group can be determined using $^{29}$Si NMR spectra irrespective of the molar mass distribution.

The silyl polyethers of formula (3) are thus compositions which also comprise compounds in which the sum of the indices (a) plus (b) in formula (3) is less than 3 on statistical average, since some of the OR groups may be replaced by silyl polyether groups. The compositions thus contain species which are formed on the silicon atom with elimination of R—OH and condensation reaction with the reactive OH group of a further molecule of the formula (3). This reaction can proceed repeatedly until, for example, all RO groups on the silicon have been exchanged for further molecules of the formula (3). The presence of more than one signal in typical $^{29}$Si NMR spectra of these compounds supports the presence of silyl groups with different substitution patterns.

The values and preferred ranges specified for the indices (a) to (j) are thus also understood merely as average values over the different species which cannot be considered individually. The variety of chemical structures and molar masses is also reflected in broad molar mass distributions, which are typical of silyl polyethers of the formula (3) and completely unusual for conventional DMC-based polyethers, of $M_w/M_n$ usually ≥1.5.

The invention further provides the process specified hereinafter for preparing novel silicone polyether copolymers, with which gelation-free products are obtained.

In the preparation process according to the invention, polyethers which have been functionalized with alkoxysilyl groups and are of the formula (3) are reacted under hydrolytic conditions with acid catalysis and/or metal complex catalysis with reactive, hydrolytically cleavable and condensable silanes and/or siloxanes, for example alkoxysilanes. Siloxanes in the context of this invention are those of the formula (5)

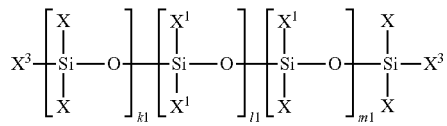

formula (5)

where
X and $X^1$ are each as defined in formula (2),
$X^3$ is a hydroxyl group or $X^2$ as defined in formula (2),
k1 is an integer from 0 to 200, preferably 0 to 50 and especially 0 to 5,
l1 is an integer from 0 to 200, preferably 0 to 50 and especially 0 to 5,
m1 is an integer from 0 to 200, preferably 0 to 50 and especially 0 to 5,
with the proviso that the sum of the indices k1, l1 and m1 is an integer of 1 to 600, preferably 1 to 150 and especially 1 to 15.

The reactive silanes used, preferably alkoxysilanes, are compounds of the formula (6)

$$U_x SiV_{(4-x)}$$ (6)

where U represent identical or different groups which are unhydrolysable in the presence of water and catalytic amounts of Bronsted acid at temperatures up to 100° C., V=identical or different groups which are hydrolysable in the presence of water and catalytic amounts of Bronsted acid at temperatures up to 100° C., or hydroxyl groups, and x=1, 2 or 3.

"Hydrolysable" in the context of this invention means that at least 80% of the groups can be hydrolysed and hence eliminated under the selected conditions.

In formula (6), the hydrolysable V groups may, for example, be H, halogen, alkoxy (preferably methoxy, ethoxy, i-propoxy, n-propoxy or butoxy), aryloxy (preferably phenoxy), acyloxy (preferably acetoxy or propionyloxy), acyl (preferably acetyl), amino, monoalkylamino or dialkylamino groups or sulphonic ester groups. The unhydrolysable U radical may, for example, be an alkyl, alkenyl, alkynyl, aryl, alkylaryl or aralkyl radical. The alkyl chain may have 0 to 50 and preferably 0 to 22 carbon atoms, or else be a silicone radical. The U and V radicals may optionally have one or more customary substituents, for example halogen or alkoxy.

Unhydrolysable U radicals of the formula (6) with functional groups may be selected from the range of the methacryloyloxyalkylene and acryloyloxyalkylene radicals, for example methacryloyloxymethyl, acryloyloxymethyl, methacryloyloxyethyl, acryloyloxyethyl, methacryloyl-oxypropyl, acryloyloxypropyl, methacryloyloxybutyl and the acryloyloxybutyl radical.

Silanes of the formula (6) preferably contain 1 to 2 leaving groups V in the form of alkoxy groups, acyloxy groups, chlorine groups, or else sulphonic ester groups, for example trimethylmethoxysilane, triphenylmethoxysilane, trimethylethoxysilane, triphenyl-ethoxysilane, triphenylsilanol, trimethylisopropoxysilane, trimethyl-n-propoxysilane, trimethylchlorosilane, trimethylacetoxysilane, trimethylsilyl trifluoromethanesulphonate, trimethylsilyl trifluoroacetate, dimethyldimethoxysilane, diphenyldimethoxysilane, dimethyldiethoxysilane, diphenyldiethoxysilane, diphenylsilanediol, diphenylmethylethoxysilane, dimethyldiisopropoxysilane, dimethyldi-n-propoxysilane, dimethyldichlorosilane, dimethyldiacetoxysilane, dimethylsilyl di(trifluoromethanesulphonate), dimethylsilyl di(trifluoroacetate). Particular preference is given to using trimethylmethoxysilane, trimethylethoxysilane, dimethyldimethoxysilane and dimethyldiethoxysilane. Chlorinated silanes are used only in small amounts, which are minor relative to the other silane and siloxane raw materials.

Preference is given to entirely avoiding the use of chlorinated silanes.

The invention therefore further also provides a process, characterized in that the silanes of the formula (6) used are chlorine-free silanes where V=alkoxy and/or acyloxy.

It is additionally possible to use cyclic siloxanes, for example hexamethylcyclotrisiloxane, octamethylcyclotetrasiloxane, decamethylcyclopentasiloxane or dodecamethylcyclohexasiloxane, or else low molecular weight silicone oils with chain lengths of up to 20 siloxy units, in order to incorporate longer silicone chains in one step. Preference is given to using hexamethyldisiloxane and decamethylcyclopentasiloxane, individually or in a mixture.

The silanes (6) are used in stoichiometric amounts or in a molar excess relative to the polyether-bound alkoxysilyl groups (3). To prevent intermolecular crosslinking and gel formation, it may be advantageous to use the reactive silanes (6) in excess. The molar ratio of polyether-bound alkoxysilyl group to alkoxy-functional silane is in the range from 1 to 50, preferably 1 to 25.

The invention therefore also provides a process for preparing silicone polyether copolymers of the formula (1), characterized in that alkoxysilyl-functional organic polymers are reacted, without gelation, by optional full or partial hydrolysis and condensation reaction of the polymer-bound alkoxysilyl groups together with reactive silanes, and also water, and in the presence of a catalyst.

The invention further also provides a process for preparing silicone polyether copolymers of the formula (1), characterized in that substoichiometric amounts of water and/or monoalkoxysilane, based on the molar content of trialkoxysilyl groups, are used per trialkoxysilyl equivalent.

The invention further also provides a process for preparing silicone polyether copolymers of the formula (1), characterized in that polyethers functionalized with alkoxysilyl groups are reacted under hydrolytic conditions with acid catalysis and/or metal complex catalysis with silanes and/or siloxanes which are reactively hydrolytically cleavable and condensable.

The invention further provides a process, characterized in that silanes of the formula (6) and/or siloxanes of the formula (5) are used

$$U_xSiV_{(4-x)} \quad (6)$$

where

U represent identical or different groups which are unhydrolysable in the presence of water and catalytic amounts of Bronsted acid at temperatures up to 100° C., V=identical or different groups which are hydrolysable in the presence of water and catalytic amounts of Bronsted acid at temperatures up to 100° C., or hydroxyl groups, and x=1, 2 or 3, and formula (5)

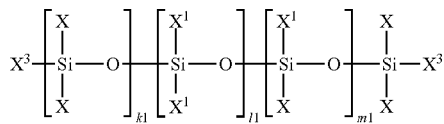

where

X and X' are each as defined in formula (2), $X^3$ is a hydroxyl group or $X^2$ as defined in formula (2), k1 is an integer from 0 to 200, preferably 0 to 50 and especially 0 to 5, l1 is an integer from 0 to 200, preferably 0 to 50 and especially 0 to 5, m1 is an integer from 0 to 200, preferably 0 to 50 and especially 0 to 5, with the proviso that the sum of the indices k1, l1 and m1 is an integer of 1 to 600, preferably 1 to 150 and especially 1 to 15.

Suitable catalysts are organic or inorganic Bronsted acids such as acetic acid or trifluoroacetic acid, mineral acids, for example sulphuric acid or hydrochloric acid, phosphoric acid, the mono- and/or diesters thereof, for example butyl phosphate, (iso)propyl phosphate, dibutyl phosphate etc., but also sulphonic acids, for example methanesulphonic acid, trifluoromethanesulphonic acid or toluenesulphonic acid. It is also possible to use the solid equilibrating acids according to the prior art, which are acidic aluminas or acidic ion exchange resins, for example the products known under the Amberlite®, Amberlyst® or Dowex® and Lewatit® brand names.

Additionally suitable are Lewis acids, for example aluminium trichloride, titanium(IV) chloride, boron trihalides, or else organic boranes with electron-withdrawing substituents, for example fluoroarylboranes, especially tris(pentafluorophenyl)borane. The further catalysts used for the crosslinking of compounds bearing alkoxysilyl groups may be organic tin compounds, for example dibutyltin dilaurate, dioctyltin dilaurate, dibutyltin diacetylacetonate, dibutyltin diacetate or dibutyltin dioctoate, etc. Particular preference is given to the use of trifluoromethanesulphonic acid and trifluoroacetic acid.

The catalysts can be used individually or else in combination. The required amounts of the totality of catalysts are in the range from 0.01 to 15 percent by weight, preferably in the range from 0.1 to 6 percent by weight.

The invention therefore also further provides a process, characterized in that the catalyst used is preferably trifluoromethanesulphonic acid and/or trifluoroacetic acid.

The reaction steps of the process for preparing the silicone polyether copolymers of the formula (1) consist of the acid-catalysed hydrolysis and condensation reaction, and a distillation and neutralization step. The process can be performed stepwise, semicontinuously in a loop tubular reactor, continuously in a tubular reactor, or in a one-pot reaction. The neutralization may proceed before or after the distillation.

The hydrolysis and condensation reaction can be performed at a pressure equal to or greater than standard pressure, preferably at a pressure corresponding to the ambient atmosphere, and temperatures of 0 to 100° C., preferably at 40 to 80° C. After the reaction has ended, the volatile by-products of the condensation can be removed, for example, by gentle vacuum distillation. The distillation can be effected from a vessel, continuously via a falling-film evaporator, or else by spraying into the vacuum. If required or desired, a neutralization, for example with a basic salt, preferably with sodium hydrogencarbonate, can be effected.

The first process step of the acid-catalysed hydrolysis, condensation and optionally equilibration reaction may be followed by a second, alkali-catalysed equilibration step in order to incorporate further functionalities into the novel silicone polyether copolymers. For example, cyclic or linear siloxanes which may contain further functional groups, for example amino groups, can be incorporated by equilibration with the aid of tetraalkylammonium compounds according to the prior art described, for example, in DE 60116592 (U.S. Pat. No. 6,353,073).

The novel silicone polyether copolymers claimed in accordance with the invention advantageously differ from the polyethersiloxanes disclosed in EP 0368195 A1 (U.S. Pat. No. 4,962,218) and EP 0506086 A1 (U.S. Pat. No. 5,110,970) in that no by-products resulting from the allyl-propenyl rearrangement, for example substituents having nonterminal double bonds, especially propenyl ethers, and possibly also hydrolysis products thereof, are present. The inventive novel silicone polyether copolymers preferably do not contain any propenyl groups.

The products are thus odourless not only directly after preparation thereof, but additionally do not release any new undesired odour carriers in the course of storage.

Moreover, the novel silicone polyether copolymers claimed in accordance with the invention advantageously differ from the polyethersiloxanes disclosed in EP 0368195 A1 (U.S. Pat. No. 4,962,218) and EP 0506086 A1 (U.S. Pat. No. 5,110,970) by their comparatively low viscosity and their good storage stability, as ensured by the prevention of intermolecular crosslinking. As the comparative example disclosed in this invention shows, the viscosity of a product prepared by the process disclosed in EP 0506086 A1 (U.S. Pat. No. 5,110,970) with trimethylchlorosilane increases to more than twice the starting viscosity thereof.

Moreover, the novel silicone polyether copolymers claimed in accordance with the invention advantageously differ from the polyethersiloxanes disclosed in EP 0368195 A1 (U.S. Pat. No. 4,962,218) and EP 0506086 A1 (U.S. Pat. No. 5,110,970) in that they may contain not only bound siloxanyl groups but additionally also alkoxysiloxanyl or else alkoxysilyl groups individually or in a mixture. In contrast to the known processes for preparing silyl-functional polymers, the inventive products are siloxanyl-functional polymers whose chemically bound silicone content can be varied freely.

Moreover, the novel silicone polyether copolymers claimed in accordance with the invention differ from the polyethersiloxanes disclosed in EP 0368195 A1 (U.S. Pat. No. 4,962,218) and EP 0506086 A1 (U.S. Pat. No. 5,110,970) in that they preferably have an inherent multimodal molar mass distribution predetermined by the reactants, without this causing product dilution by-products, for example the excess polyethers present in the conventional polyethersiloxanes. During the process according to the invention, the modality is usually unaffected. When transesterification products present in the precursors are fully or partly cleaved under the hydrolytically acidic conditions, the modality can be reduced, for example from 3 to 2 as disclosed in Example 8.

With regard to the quality and storage stability of the end products, the process according to the invention has the advantage that the silicone polyether copolymers prepared in accordance with the invention and the conversion products, and the compositions and formulations comprising silicone polyether copolymers, produced therefrom, do not possess any tendency to gelate and hence can be stored over a prolonged period with no significant change in the viscosity of the products.

The invention further provides compositions comprising silicone polyether copolymers of the formula (1) and further silicone surfactants, organic surfactants, solvents, for example alkanes, halogenated alkanes, substituted or unsubstituted aromatics, esters, ethers, glycols, oils of natural and synthetic origin or polyethers, amines, amides, acids, bases or buffer systems thereof for pH adjustment, flame retardants, catalysts, antioxidants, additives for control of rheological properties, for example thickeners, wetting agents or levelling agents, dispersing additives, solid inorganic or solid organic fillers, particles, binders, solid or liquid dyes, stabilizers, UV absorbers, biocides and/or antistats.

The process according to the invention additionally has the advantage over the process described in EP-A1-0 506 086 (U.S. Pat. No. 5,110,970) that, as a result of the avoidance of use of chlorosilanes, no corrosive offgas and no organochlorine compounds occur. A particular advantage over the process described in EP-A1-0 368 195 (U.S. Pat. No. 4,962,218) is that it is possible to dispense with a distillative purification of the silanes and siloxanes used as reactants.

The process according to the invention also allows the synthesis of silicone polyethers of the formula (1) which bear free reactive alkoxysilyl groups. Those compounds in which index a1 in formula (1) on average is greater than 0 and which have at least one Si—O—R function per molecule form when a deficiency of water and reactive U groups in the silane of the formula (6) is used in relation to the Si—O—R groups of the silyl polyether of the formula (3) used.

BRIEF DESCRIPTION OF THE DRAWINGS

FIG. 1 is a larger depiction of the structure of formula (1).
FIG. 2 is a large depiction of the structure of formula (3).
Further subjects of the invention are evident from the claims, the entire disclosure-content of which forms part of the description of this invention.

The examples adduced below describe the present invention by way of example, without any intention that the invention, the breadth of application of which is evident from the entire description and the claims, be restricted to the embodiments cited in the examples.

GPC measurements to determine the polydispersity and mean molar masses were performed under the following analysis conditions: column combination SDV 1000/10 000 Å (length 65 cm), temperature 30° C., THF as mobile phase, flow rate 1 ml/min, sample concentration 10 g/l, RI detector, evaluation against polypropylene glycol standard.

OH numbers were measured by the cold acetylation method based on the analysis method C-V 17A (98) from the German Society for Fat Science (DGF).

The epoxy oxygen content of the silyl polyethers was determined in the presence of conc. HCl by the principle of back-titration with sodium hydroxide solution.

The viscosities were measured on the basis of DIN 53019 with a Haake RV12 rotational viscometer at 25° C.

The ratio of the M, D and T units with respect to one another was determined by $^{29}$Si NMR spectroscopy on a Bruker NMR spectrometer at a frequency of 79.4 MHz. The NMR analysis method and evaluation of the signals are described in textbooks and hence familiar to the person skilled in the art. (Literature: A. J. Brandolini, D. D. Hills, "NMR-Spectra of Polymers and Polymer Additives" © 2000 Marcel Dekker Inc., Chapter IX.B.1. on pages 414 ff.) The slight deviations, observed in the examples which follow, in the M/T ratios measured from the theoretical value of 3:1 is a measure of the degree of conversion achieved. For example, an M/T ratio of 2.4:1 means that 80% of the alkoxy substituents present in the precursor have been replaced by trimethylsiloxy groups. As a result of the Fourier analysis and the weighting factors selected, and the noise level present in the spectra, deviations additionally occur between the graphically determined signal ratios and the theoretically determined values. A measured M/T ratio of 2.9:1 may be within the range of the theoretical value of 3:1 owing to the systematic measurement uncertainty.

The following polyethers containing alkoxysilyl groups were used, which were prepared according to the as yet unpublished document DE 10 2008 000360.3 (U.S. Ser No. 12/389,667) by the process principle of DMC-catalysed alkoxylation of 3-glycidyloxypropyltriethoxysilane (GLYEO) with propylene oxide (PO) and ethylene oxide (EO):

Silyl Polyether SP-1:
Low molecular weight, allyl alcohol-started, almost colourless, low-viscosity polyether of mean molar mass approx. 1800 g/mol and two-fold trialkoxysilane functionality.

Chemical Structure According to Monomer Dosage:
Allyl alcohol+(7.6 mol PO/15 mol EO)+2 mol GLYEO+1 mol PO Epoxy oxygen content <0.05%, OH number 28.0 g/mol Silyl Polyether SP-2:
   Short-chain allyl alcohol-based, low-viscosity polyether of mean molar mass approx. 1350 g/mol and two-fold trialkoxysilane functionality.
Chemical Structure According to Monomer Dosage:
Poly(propylene-co-ethylene glycol) monoallyl ether (600 g/mol)+2 mol of propylene oxide+2 mol of GLYEO+1 mol of propylene oxide
Epoxy oxygen content <0.05%, M, by GPC 4150 g/mol, viscosity 291.4 mPa*s (25° C.)
Silyl Polyether SP-3:
   Short-chain allyl alcohol-based, low-viscosity polyether of mean molar mass approx. 1100 g/mol and two-fold trialkoxysilane functionality.
Chemical Structure According to Monomer Dosage:
Polyethylene glycol monoallyl ether (400 g/mol)+2 mol of propylene oxide+2 mol of GLYEO+1 mol of propylene oxide
Epoxy oxygen content <0.05%, viscosity 146.0 mPa*s (25° C.) The GPC shows a multimodal curve with maxima at about 250, 700 and 3000 g/mol, a mass-average molar mass Mw of 4153 g/mol and a polydispersity Mw/Mn of 2.59.
Silyl Polyether SP-4:
   Low molecular weight, octanol-started, almost colourless and low-viscosity polyether of mean molar mass approx. 3000 g/mol and seven-fold trialkoxysilane functionality.
Chemical Structure According to Monomer Dosage:
1-Octanol+8 mol of propylene oxide+(7 mol of GLYEO/10 mol of propylene oxide)
Epoxy oxygen content <0.05%, OH number 19.5 mg KOH/g, $M_w$ by GPC 2760 g/mol, viscosity (25.0° C.) 238.3 mPa*s
Silyl Polyether SP-5:
   High molecular weight polypropylene glycol-started, almost colourless and viscous polyether of mean molar mass approx. 15 400 g/mol and six-fold trialkoxysilane functionality.
Chemical Structure According to Monomer Dosage:
PPG(2000 g/mol)+198 mol PO+6 mol GLYEO+4 mol PO
EPOXY oxygen content <0.05%. The GPC shows a multimodal curve with maxima at about 5500, 10 000 and 20 000 g/mol, a mass-average molar mass Mw of 15 552 g/mol and a polydispersity Mw/Mn of 2.52.

EXAMPLES

The invention is further described by the following non-limiting examples which further illustrate the invention, and are not intended, nor should they be interpreted to, limit the scope of the invention.

Example 1 (Inventive)

A 250 ml four-neck flask equipped with a precision glass stirrer, an internal thermometer, a dropping funnel and a distillation apparatus is initially charged with 30 g of trimethylethoxysilane at room temperature, and 0.45 ml of trifluoroacetic acid is added with stirring. After heating to 60° C., a mixture of 37.2 g of silyl polyether SP-1 and 20.16 g of demineralized water is added dropwise over a period of one hour. After the metered addition has ended, the cloudy reaction mixture is stirred at 60° C. for 3 hours. 3 g of sodium hydrogencarbonate are added and the mixture is stirred for half an hour at room temperature. After filtering through a fluted filter, a clear solution is obtained. The ethanol formed from the reaction is distilled off at 70° C. and 5 to 15 mbar within 45 minutes. This gives a clear, homogeneous, low-viscosity (<250 mPa*s) product. In the $^{29}$Si NMR spectrum, no signals from the starting compounds are discernible any longer. The ratio of M units to T units is 2.9 to 1 (theory 3:1).

Example 2 (Inventive)

A 250 ml four-neck flask equipped with a precision glass stirrer, an internal thermometer, a dropping funnel and a distillation apparatus is initially charged with 31.8 g of trimethylethoxysilane at room temperature, and 0.42 ml of trifluoroacetic acid is added with stirring. After heating to 60° C., a mixture of 30.0 g of silyl polyether SP-2 and 21.4 g of demineralized water is added dropwise over a period of 1.5 hours. After the metered addition has ended, the cloudy reaction mixture is stirred at 60° C. for 3 hours. The ethanol formed during the reaction is distilled off at 60° C. and 50 mbar within one hour. 1.7 g of sodium hydrogencarbonate are added and the mixture is stirred at room temperature for half an hour. After filtering through a fluted filter, a clear, homogeneous, yellowish product with a viscosity of 204 mPa*s at 25° C. is obtained. In the $^{29}$Si NMR spectrum, no signals of the starting compounds are discernible any longer. The ratio of M units to T units is 2.7 to 1 (theory 3:1).

Example 3 (Inventive)

A 250 ml four-neck flask equipped with a precision glass stirrer, an internal thermometer, a dropping funnel and a distillation apparatus is initially charged with 21.8 g of hexamethyldisiloxane at room temperature, and 0.42 ml of trifluoroacetic acid is added with stirring. After stirring at 70° C. for 1 hour, a mixture of 30.0 g of silyl polyether SP-2 and 21.4 g of demineralized water is added dropwise over a period of one hour. After the metered addition has ended, the cloudy reaction mixture is stirred at 70° C. for 3 hours. The ethanol formed during the reaction is distilled off at 70° C. and 20 mbar within one hour. 1.7 g of sodium hydrogencarbonate are added and the mixture is stirred at room temperature for half an hour. After filtering through a fluted filter, a clear, homogeneous, yellowish product with a viscosity of 294.2 mPa*s at 25° C. is obtained.

Example 4 (Noninventive)

A 250 ml four-neck flask equipped with a precision glass stirrer, an internal thermometer, a dropping funnel and a distillation apparatus is initially charged with 29.2 g of trimethylchlorosilane at 50° C. A mixture of 30.0 g of silyl polyether SP-2 and 24.2 g of demineralized water are added dropwise at 50° C. over a period of one hour. After the metered addition has ended, the cloudy reaction mixture is stirred at 50° C. for three hours. The acidic offgas released during the reaction turns a piece of moistened pH paper red. After the reaction has ended, all volatile constituents are distilled off at 50° C. and 20 mbar for one hour. 1.7 g of sodium hydrogencarbonate are added and the mixture is stirred at room temperature for half an hour. After filtration through a fluted filter, a clear, yellowish product with more than double the viscosity of the silyl polyether SP-2, of 720 mPa*s, is obtained. The ratio of M units to T units determined from the $^{29}$Si NMR spectrum is 0.9 to 1 (theory 3:1).

Example 5 (Inventive)

A 250 ml four-neck flask equipped with a precision glass stirrer, an internal thermometer, a dropping funnel and a distillation apparatus is initially charged with 37.7 g of trimethylethoxysilane and 11.8 g of decamethylcyclopentasiloxane at room temperature, and 0.5 ml of trifluoroacetic acid is added with stirring. After stirring at 70° C. for one hour, a mixture of 30.0 g of silyl polyether SP-3 and 13.6 g of demineralized water is added dropwise over a period of one hour. After the metered addition has ended, the cloudy reaction mixture is stirred at 70° C. for 3 hours. The ethanol formed from the reaction is distilled off at 70° C. and 50 mbar for one hour. 1.7 g of sodium hydrogencarbonate are added and the mixture is stirred at room temperature for half an hour. After filtration through a fluted filter, a clear, homogeneous, yellowish product with a viscosity of 87.5 mPa*s is obtained. In the $^{29}$Si NMR spectrum, no signals of the starting compounds are discernible any longer. The ratio of M units to D and T units is 2.7:2.6:1 (theory 3:3:1). The GPC shows a multimodal curve with maxima at about 500, 900 and 1400 g/mol, a mass-average molar mass Mw of 1256 g/mol and a polydispersity Mw/Mn of 1.47.

Example 6 (Inventive)

A 250 ml four-neck flask equipped with a precision glass stirrer, an internal thermometer, a dropping funnel and a distillation apparatus is initially charged with 37.7 g of trimethylethoxysilane at room temperature, and 0.7 g of dibutyltin diacetylacetonate is added with stirring. After heating to 70° C., a mixture of 30.0 g of silyl polyether SP-3 and 13.6 g of demineralized water is added dropwise over a period of 1.5 hours. After the metered addition has ended, the cloudy reaction mixture is stirred at 70° C. for 3 hours. The volatile reaction products are distilled off at 70° C. and 20 mbar. This gives a homogeneous, slightly cloudy, yellowish, low-viscosity product.

Example 7 (Inventive)

A 250 ml four-neck flask equipped with a precision glass stirrer, an internal thermometer, a dropping funnel and a distillation apparatus is initially charged with 54.0 g of trimethylethoxysilane at room temperature, and 0.5 ml of trifluoroacetic acid is added with stirring. After stirring at 70° C. for 30 minutes, a cloudy mixture of 30.0 g of silyl polyether SP-4 and 41.1 g of demineralized water is added dropwise over a period of 1.5 hours. After the metered addition has ended, the cloudy reaction mixture is stirred at 70° C. for 3 hours. The ethanol formed from the reaction is distilled off at 70° C. and 20 mbar for one hour. 1.7 g of sodium hydrogencarbonate are added and the mixture is stirred at room temperature for half an hour. After filtration through a fluted filter, a clear, homogeneous, yellowish product with a viscosity of 217.6 mPa*s at 25° C. is obtained. In the $^{29}$Si NMR spectrum, no signals of the starting compounds are discernible any longer. The ratio of M units to T units is 2.2 to 1 (theory 3:1).

Example 8 (Inventive)

A 250 ml four-neck flask equipped with a precision glass stirrer, an internal thermometer, a dropping funnel and a distillation apparatus is initially charged with 16.4 g of trimethylethoxysilane at room temperature and 0.5 ml of trifluoroacetic acid is added and the mixture is stirred at 70° C. for 30 minutes. 60.0 g of the high-viscosity silyl polyether SP-5 are admixed with 20.0 g of ethanol and combined with 12.5 g of demineralized water for simpler metered addition. This mixture is added dropwise to the acidified silane at 70° C. while stirring over a period of 1.5 hours. After the metered addition has ended, the cloudy reaction mixture is stirred at 70° C. for 3 hours. After distilling off the ethanol at 70° C. and 20 mbar, a clear homogeneous product is obtained, which is less viscous than the silyl polyether SP-5. In the $^{29}$Si NMR spectrum, no signals of the starting compounds are discernible any longer. The ratio of M units to T units is 2.4 to 1 (theory 3:1). The GPC shows a multimodal curve with maxima at about 5500 and 10 000 g/mol, a mass-average molar mass Mw of 9561 g/mol and a polydispersity Mw/Mn of 1.85.

Having thus described in detail various embodiments of the present invention, it is to be understood that the invention defined by the above paragraphs is not to be limited to particular details set forth in the above description as many apparent variations thereof are possible without departing from the spirit or scope of the present invention.

The invention claimed is:
1. A process for preparing a silicone polyether copolymer of the formula (1), comprising:
reacting alkoxysilyl-functional organic polymers, without gelation, by optional full or partial hydrolysis and condensation reaction of the polymer-bound alkoxysilyl groups together with reactive silanes, and also water, and in the presence of a catalyst;
wherein the formula (1) is:

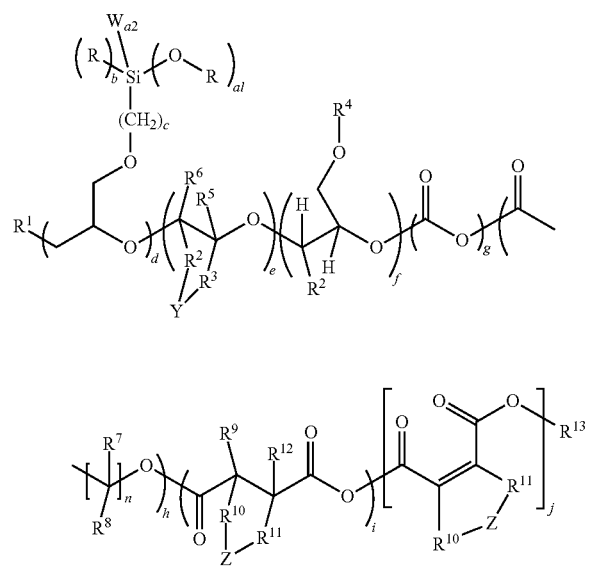

formula (1)

where:
a1 is an integer of 0, 1, or 2;
a2 is an integer of 1, 2, or 3;
b is an integer of 0, 1, or 2, and the sum of a1, a2, and b is equal to 3;
c is an integer of 0 to 22;
d is an integer of 1 to 500;
e is an integer of 0 to 10 000;
f is an integer of 0 to 1000;

g is an integer of 0 to 1000;

h, i, and j are each independently integers of 0 to 500;

n is an integer from 2 to 8;

R are independently one or more identical or different radicals selected from linear or branched, saturated, mono- or polyunsaturated alkyl radicals having 1 to 20 carbon atoms or haloalkyl groups having 1 to 20 carbon atoms; and $R^1$ is:

a hydroxyl group; or a saturated or unsaturated, linear, branched or cyclic, or further-substituted oxyorganic radical having 1 to 1500 carbon atoms, where the chain may also be interrupted by heteroatoms selected form the group consisting of O, S, Si, and N; or a radical comprising an oxyaromatic system, or an unsaturated ether-functional group in which there is no C—C double bond in a β position to an oxygen or C—C double bonds are present only terminally;

Y may be absent, or is a methylene bridge having 1 or 2 methylene units;

$R^2$ and $R^3$ are the same or else independently selected from the group consisting of:

H; and a saturated, monounsaturated, or polyunsaturated, optionally further-substituted, mono-or polyvalent hydrocarbon radical;

where if the $R^2$ and $R^3$ radicals are each a polyvalent hydrocarbon radical then the hydrocarbon radical is further substituted or is bridged cycloaliphatically via the Y fragment;

$R^4$ is a linear or branched alkyl radical of 1 to 24 carbon atoms or an aromatic or cycloaliphatic radical which may optionally in turn bear alkyl groups;

$R^5$ and $R^6$ are the same or else independently selected from the group consisting of:

H; and a saturated, monounsaturated, or polyunsaturated, optionally further-substituted, monovalent hydrocarbon radical;

$R^7$ and $R^8$ are each independently hydrogen, alkyl, alkoxy, aryl or aralkyl groups;

$R^9$ and $R^{12}$ are each independently hydrogen, alkyl, alkenyl, alkoxy, aryl, or aralkyl groups;

$R^{10}$ and $R^{11}$ are each independently selected from the grouop consisting of:

hydrogen, alkyl, alkenyl, alkoxy, aryl, aralkyl, alkylene, arylene, and aralkylene groups;

where if the radicals $R^{10}$ and $R^{11}$ are each a polyvalent hydrocarbon radical, the hydrocarbon radical is bridged cycloaliphatically or aromatically via the Z fragment and Z may either be a divalent alkylene or alkenylene radical;

$R^{13}$ is either hydrogen or W2; and

W is an organomodified silyl or siloxanyl radical of the formula (2):

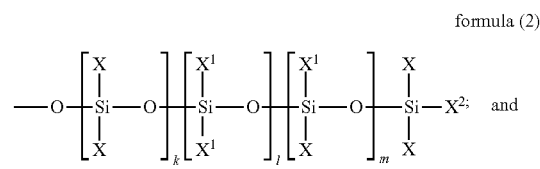

W2 is an organomodified silyl or siloxanyl radical of the modified formula (2):

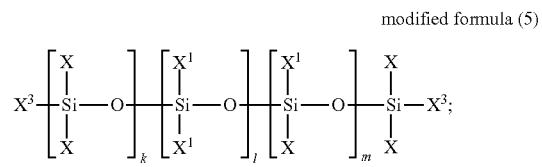

where:

k is an integer of 0 to 200;

l is an integer of 0 to 200;

m is an integer of 0 to 200;

X is a linear, cyclic or branched, aliphatic or aromatic, saturated or unsaturated hydrocarbon radical having 1 to 20 carbon atoms, which may optionally contain heteroatoms;

$X^1$ is hydrogen or a linear, cyclic or branched, aliphatic or aromatic, saturated or unsaturated hydrocarbon radical having 1 to 20 carbon atoms, and may contain heteroatoms, but is different from X;

$X^2$ is X, $X^1$, or an alkoxy group;

with the proviso that the sum of the fragments d to j is greater than or equal to 3 when $R^1$ consists only of one monomer or oligomer; and with the proviso that the fragments with the indices d, e, f, and/or h are freely permutable with one another, as are the fragments with the indices k, l, and/or m, i.e. are exchangeable for one another within the polyether chain or the siloxane chain and may be present as desired in random distribution or in block sequence and hence are exchangeable for one another in the sequence within the polymer chain.

2. The process for preparing silicone polyether copolymers of the formula (1) according to claim 1;

wherein substoichiometric amounts of water and/or monoalkoxysilane, based on the molar content of trialkoxysilyl groups, are used per trialkoxysilyl equivalent.

3. A process for preparing a silicone polyether copolymer of the formula (1), comprising:

reacting polyethers funcdonalized with alkoxysilyl groups under hydrolytic conditions with acid catalysis and/or metal complex catalysis with silanes and/or siloxanes which are reactively hydrolytically cleavable and condensable;

wherein the formula (1) is:

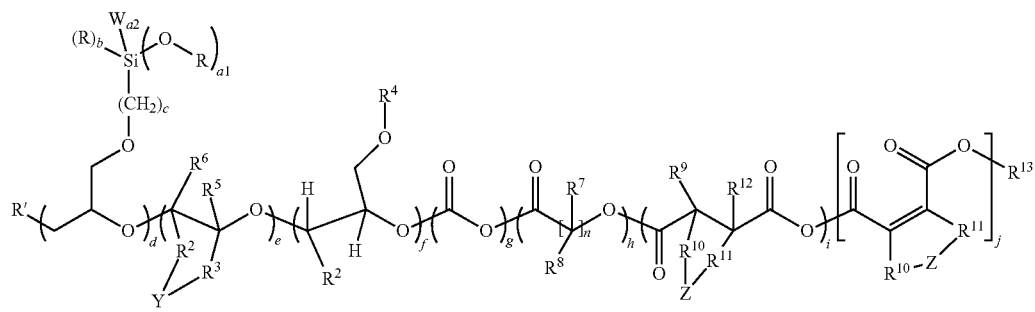

formula (1)

where:
a1 is an integer of 0, 1, or 2;
a2 is an integer of 1, 2, or 3;
b is an integer of 0, 1, or 2, and the sum of a1, a2, and b is equal to 3;
c is an integer of 0 to 22;
d is an integer of 1 to 500;
e is an integer of 0 to 10 000;
f is an integer of 0 to 1000;
g is an integer of 0 to 1000;
h, i, and j are each independently integers of 0 to 500;
n is an integer from 2 to 8;
R are independently one or more identical or different radicals selected from linear or branched, saturated, mono-or polyunsaturated alkyl radicals having 1 to 20 carbon atoms or haloalkyl groups having 1 to 20 carbon atoms; and
$R^1$ is:
  a hydroxyl group; or
  a saturated or unsaturated, linear, branched or cyclic, or further-substituted oxyorganic radical having 1 to 1500 carbon atoms, where the chain may also be interrupted by heteroatoms selected form the group consisting of O, S, Si, and N; or
  a radical comprising an oxyaromatic system, or
  an unsaturated ether-functional group in which there is no C—C double bond in a β position to an oxygen or C—C double bonds are present only terminally;
Y may be absent, or is a methylene bridge having 1 or 2 methylene units;
$R^2$ and $R^3$ are the same or else independently selected from the group consisting of:
  H; and
  a saturated, monounsaturated, or polyunsaturated, optionally further-substituted, mono-or polyvalent hydrocarbon radical;
  where if the $R^2$ and $R^3$ radicals are each a polyvalent hydrocarbon radical then the hydrocarbon radical is further substituted or is bridged cycloallphatically via the Y fragment;
$R^4$ is a linear or branched alkyl radical of 1 to 24 carbon atoms or an aromatic or cycloaliphatic radical which may optionally in turn bear alkyl groups;
$R^5$ and $R^6$ are the same or else independently selected from the group consisting of:
  H; and
  a saturated, monounsaturated, or polyunsaturated, optionally further-substituted, monovalent hydrocarbon radical;

$R^7$ and $R^8$ are each independently hydrogen, alkyl, alkoxy, aryl or aralkyl groups;
$R^9$ and $R^{12}$ are each independently hydrogen, alkyl, alkenyl, alkoxy, aryl, or aralkyl groups;
$R^{10}$ and $R^{11}$ are each independently selected from the group consisting of:
  hydrogen, alkyl, alkenyl, alkoxy, aryl, aralkyl, alkylene, arylene, and aralkylene groups;
  where if the radicals R and $R^{11}$ are each a polyvalent hydrocarbon radical, the hydrocarbon radical is bridged cycloaliphatically or aromatically via the Z fragment and Z may either be a divalent alkylene or alkenylene radical;
$R^{13}$ is either hydrogen or W2; and
W is an organomodified silyl or siloxanyl radical of the formula (2):

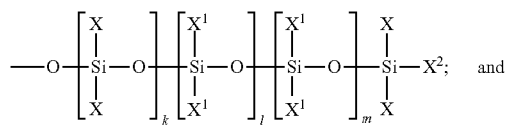

formula (2)

W2 is an organomodified silyl or siloxanyl radical of the modified formula (2):

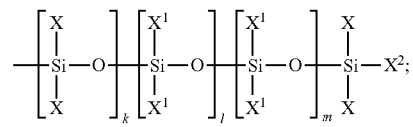

modified formula (2)

where:
k is an integer of 0 to 200;
l is an integer of 0 to 200;
m is an integer of 0 to 200;
X is a linear, cyclic or branched, aliphatic or aromatic, saturated or unsaturated hydrocarbon radical having 1 to 20 carbon atoms, which may optionally contain heteroatoms;
$X^1$ is hydrogen or a linear, cyclic or branched, aliphatic or aromatic, saturated or unsaturated hydrocarbon radical having 1 to 20 carbon atoms, and may contain heteroatoms, but is different from X;

$X^2$ is X, $X^1$, or an alkoxy group;

with the proviso that the sum of the fragments d to j is greater than or equal to 3 when $R^1$ consists only of one monomer or oligomer; and with the proviso that the fragments with the indices d, e, f, and/or h are freely permutable with one another, as are the fragments with the indices k,l, and/or m, i.e. are exchangeable for one another within the polyether chain or the siloxane chain and may be present as desired in random distribution or in block sequence and hence are exchangeable for one another in the sequence within the polymer chain.

4. The process according to claim 3;

wherein silanes of the formula (6) and/or siloxanes of the formula (5) are used;

wherein the formula (6) is represented by:

where:

U represent identical or different groups which are unhydrolysable in the presence of water and catalytic amounts of Bronsted acid at temperatures up to 100° C.;

V=identical or different groups which are hydrolysable in the presence of water and catalytic amounts of Bronsted acid at temperatures up to 100° C., or hydroxyl groups; and x=1, 2, or 3; and wherein the formula (5) is represented by:

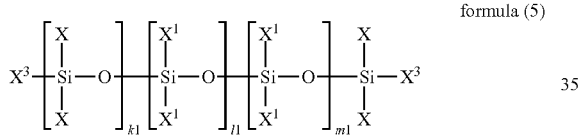

where:

X and $X^1$ are each as defined in formula (2);

$X^3$ is a hydroxyl group or $X^2$ as defined in formula (2);

k1 is an integer from 0 to 200;

l1 is an integer from 0 to 200; and m1 is an integer from 0 to 200;

with the proviso that the sum of the indices k1, l1 and m1 is an integer of 1 to 600.

5. The process according to claim 4;

wherein the silanes of the formula (6) used are chlorine-free silanes where V=alkoxy and/or acyloxy.

6. The process according to claim 1;

wherein the catalysts used are trifluoromethanesulphonic acid and/or trifluoroacetic acid.

7. The process according to claim 4;

wherein:

k1 is an integer from 0 to 50;

l1 is an integer from 0 to 50; and m1 is an integer from 0 to 50;

with the proviso that the sum of the indices k1, l1 and m1 is an integer of 1 to 150.

8. The process according to claim 7;

wherein:

k1 is an integer from 0 to 5;

l1 is an integer from 0 to 5; and m1 is an integer from 0 to 5;

with the proviso that the sum of the indices k1, l1, and m1 is an integer of 1 to 15.

* * * * *